Feb. 15, 1955 G. HYMAN 2,701,932

TELEPHONE INDEX PEDESTAL AND PAD

Filed Aug. 28, 1952 3 Sheets-Sheet 1

INVENTOR.
GEORGE HYMAN

BY L. S. Saulsbury

ATTORNEY

Feb. 15, 1955 G. HYMAN 2,701,932

TELEPHONE INDEX PEDESTAL AND PAD

Filed Aug. 28, 1952 3 Sheets-Sheet 2

INVENTOR.
GEORGE HYMAN
BY
L. S. Saulsbury
ATTORNEY

Feb. 15, 1955 G. HYMAN 2,701,932

TELEPHONE INDEX PEDESTAL AND PAD

Filed Aug. 28, 1952 3 Sheets-Sheet 3

INVENTOR.
GEORGE HYMAN
BY
L. S. Saulsbury
ATTORNEY

United States Patent Office

2,701,932

Patented Feb. 15, 1955

2,701,932

TELEPHONE INDEX PEDESTAL AND PAD

George Hyman, Bronx, N. Y.

Application August 28, 1952, Serial No. 306,781

3 Claims. (Cl. 45—.5)

This invention relates to a telephone index pedestal and pad.

It is an object of the present invention to provide a telephone index pedestal adapted to make readily accessible the names and telephone numbers of frequently used telephone numbers and to provide in the same pedestal a pad which can be readily made available.

It is another object of the invention to provide a telephone index pedestal having two trays lying one above the other with the upper tray being smaller than the lower tray, so connected together that upon pulling the lower tray outwardly the upper tray will likewise be moved outwardly, the lower tray adapted to carry an advertising card bearing the telephone numbers of the local merchants and the upper tray adapted to contain the standard telephone index and movable to a position where the book can be readily opened in order to provide access to the telephone numbers listed therein.

It is another object of the invention to provide in a telephone index pedestal a drawer for containing the telephone index book with means for elevating the book to permit its easy removal from the drawer and automatically as the drawer is pulled, the said elevating means providing the handle for the drawer.

It is another object of the invention to provide in a telephone index pedestal a drawer adapted to contain two memorandum pads, one at one side and one at the other, and wherein the drawer can be arranged to be pulled from either one side of the pedestal or from the other in order to make accessible one pad or the other as for either a right hand or left hand person and wherein the stop means for the drawer containing the memorandum can be adjusted so that the drawer when adapted to be pulled from one side or the other can be pulled the full extent and held by the stop means against the removal of the drawer from the pedestal.

It is another object of the invention to provide a telephone index pedestal made in the form of a cover for a candy box whereby a supply of candy can be kept readily available for the user of the telephone.

It is still another object of the invention to provide a telephone index pedestal wherein the drawers therein are of sufficient depth to contain layers of candy and wherein the top is provided with an oval shaped closure member which may serve as a cover for the pedestal that may be lifted to provide access to candy resting upon the drawers within the pedestal and wherein the closure member can be inverted and supported upon the pedestal in a manner to receive the base of the telephone.

Other objects of the invention are to provide a telephone index pedestal and pad having the above objects in mind which is of simple construction, inexpensive to manufacture, has a minimum number of parts, compact, of pleasing appearance, easy to operate and use, renders available advertising matter, durable and efficient in operation.

For other objects and for a better understanding of the invention reference may be had to the following detailed description taken in connection with the accompanying drawing, in which.

Figures 1, 2:
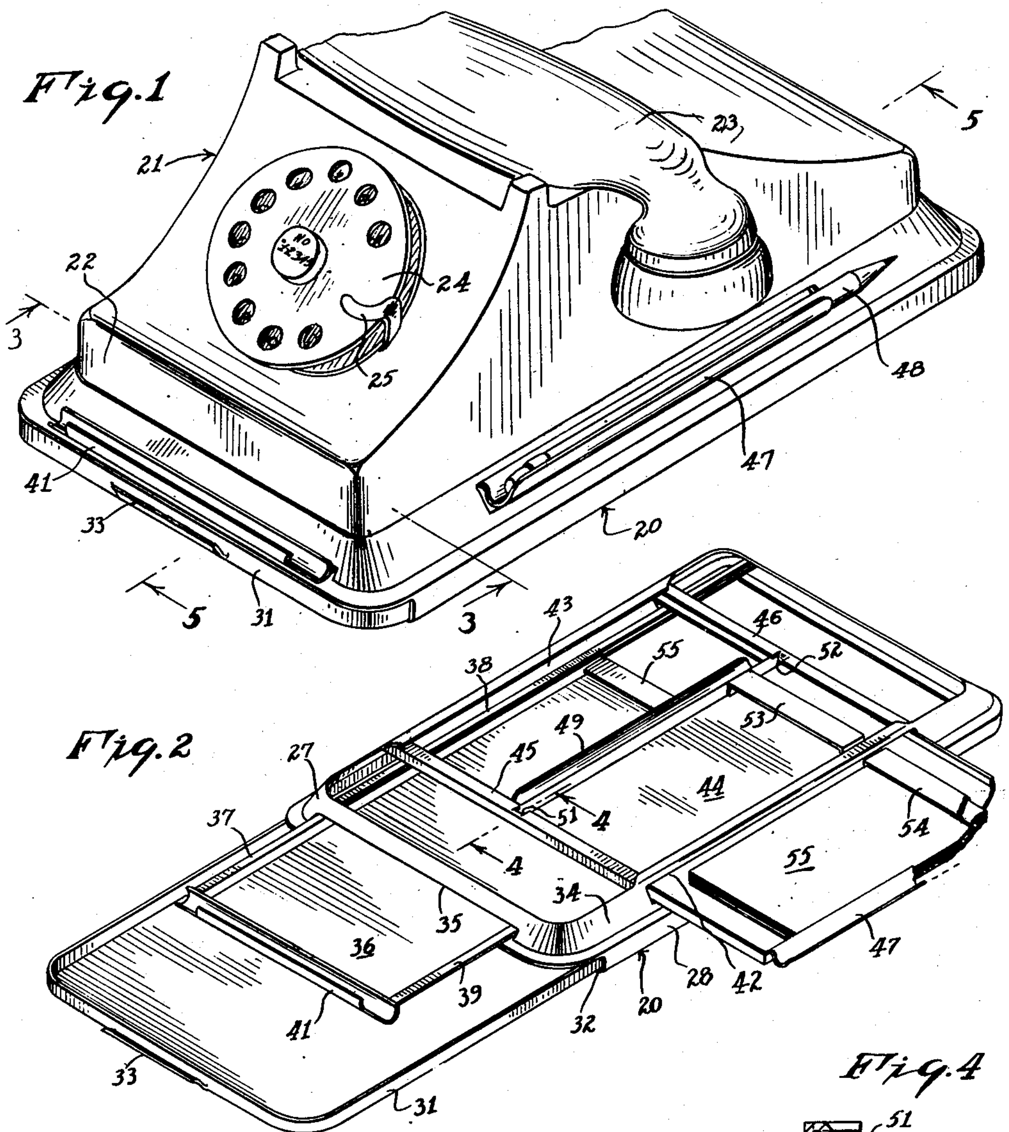
Figure 1 is a perspective view of a telephone index pedestal and pad constructed according to one form of the invention with a telephone set mounted thereon.
Fig. 2 is a perspective view of the telephone index pedestal with the drawers thereof extended and the telephone set removed from the top thereof; so that the interior construction can be viewed.
Figure 3:
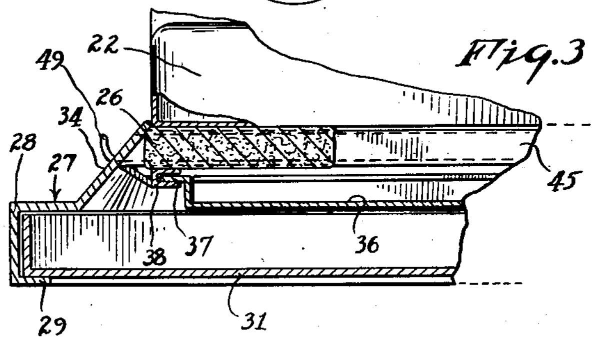
Fig. 3 is an enlarged fragmentary sectional view taken generally on line 3—3 of Fig. 1.
Figure 4:
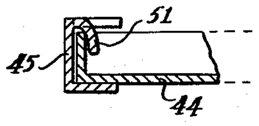
Fig. 4 is a detail fragmentary sectional view of the drawer stop, the view being taken generally on line 4—4 of Fig. 2.
Figure 5:
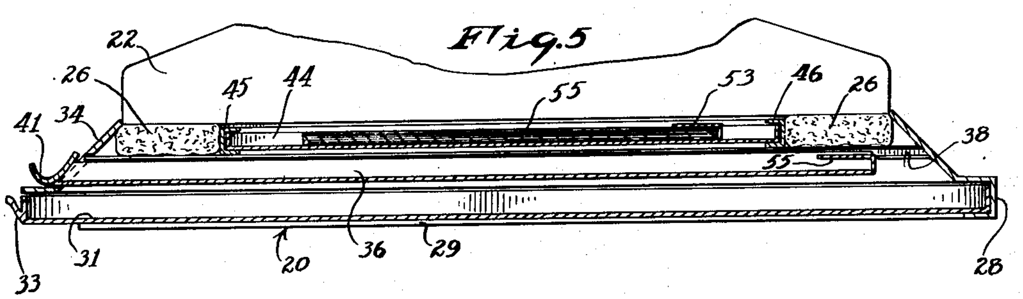
Fig. 5 is a longitudinal sectional view.

Referring now particularly to Figs. 1 to 5, 20 represents the telephone index pedestal and pad constructed according to one form of the invention and on which is mounted a telephone set 21 having a rectangular shaped base 22, a hand set 23 and a dial 24 with a finger stop 25. The base 22 of the telephone set has felt or rubber pads 26 in the four corners of the base 22.

The telephone index pedestal comprising a main body 27 having a bottom portion 28 with an inwardly turned bottom flange 29 on which a bottom tray 31 slides. The bottom portion 28 has an end opening 32 through which the drawer 31 is extended, Fig. 2. This drawer 31 has a handle 33 by which the drawer 31 can be pulled from the pedestal 20 or pushed thereinto.

Extending upwardly from the bottom portion 28 and inwardly of the periphery thereof is an upwardly and inwardly inclined portion 34 which is open at the top to receive the base 22 of the telephone set 21.

Above the drawer 31 and in the end of the upwardly and inwardly inclined portion 34 is an end opening 35 through which a drawer or tray 36 can be pulled or pushed. The drawer has a laterally extending flange 37 at one side thereof which runs in a channel 38 fixed to one side of the portion 34 and extending inwardly thereof. The opposite side of the tray 36 has a flange 39 which runs in a similarly arranged channel disposed at the opposite side of the portion 34, but not shown. This channel is similar to the channel 37 which can be viewed in Fig. 3. It will thus be seen that the tray 36 can be brought outwardly over the drawer 31. This tray 36 has a pull handle 41 of such size and shape as to support a pencil or pen.

In the opposite side of the upwardly and inwardly inclined portion 34 are openings 42 and 43 through which a pad tray 44 can be extended. Longitudinally spaced from one another and extending across the sides of the upwardly and inwardly inclined portion 34 are opposing channel members 45 and 46 in which the sides of the drawer or tray 44 slide, Figs. 2 and 4. The width of this drawer 44 and the spacing of the channel members 45 and 46 is such that the rubber or felt foot portions 26 of the telephone set 21 can straddle them and be rested upon the channel members 37 of the drawer 36, Fig. 3.

The tray 44 has a pencil supporting pull handle 47 for supporting a pencil 48 on one end of the tray 44 and a similar pencil supporting pull handle 49 on the opposite end of the tray 44. The upper flange of the channel member 45 is struck downwardly as indicated at 51, Figs. 2 and 4, to provide a stop for the engagement of the handles 47 and 49 of the tray 44, depending upon the side to which the tray 44 has been extended. A similarly downwardly struck portion 52 is provided on the upper flange of the channel 46, Fig. 2. The tray 44 is provided at the opposite end thereof with raised holders 53 and 54 for retaining pads 55. The drawer 36 has a similar holder 55 for retaining the index book that may be placed in this drawer 36.

It will thus be seen that the drawer or tray 42 bearing the memorandum pads 55 can be pulled from either side of the pedestal 20 depending on whether the user is either left or right handed. It will also be seen that there are two drawers that can be pulled out of the front of the pedestal. The bottom drawer is adapted to receive and retain a card bearing the advertising data of the local merchants and their telephone numbers. The drawer 36 is adapted to retain an index book bearing the telephone numbers frequently used. It will be seen that there are three different drawers or trays provided in this relatively flat telephone index pedestal. The portions thereof can be made either of metal or plastic.

Figures 6, 7, 8:
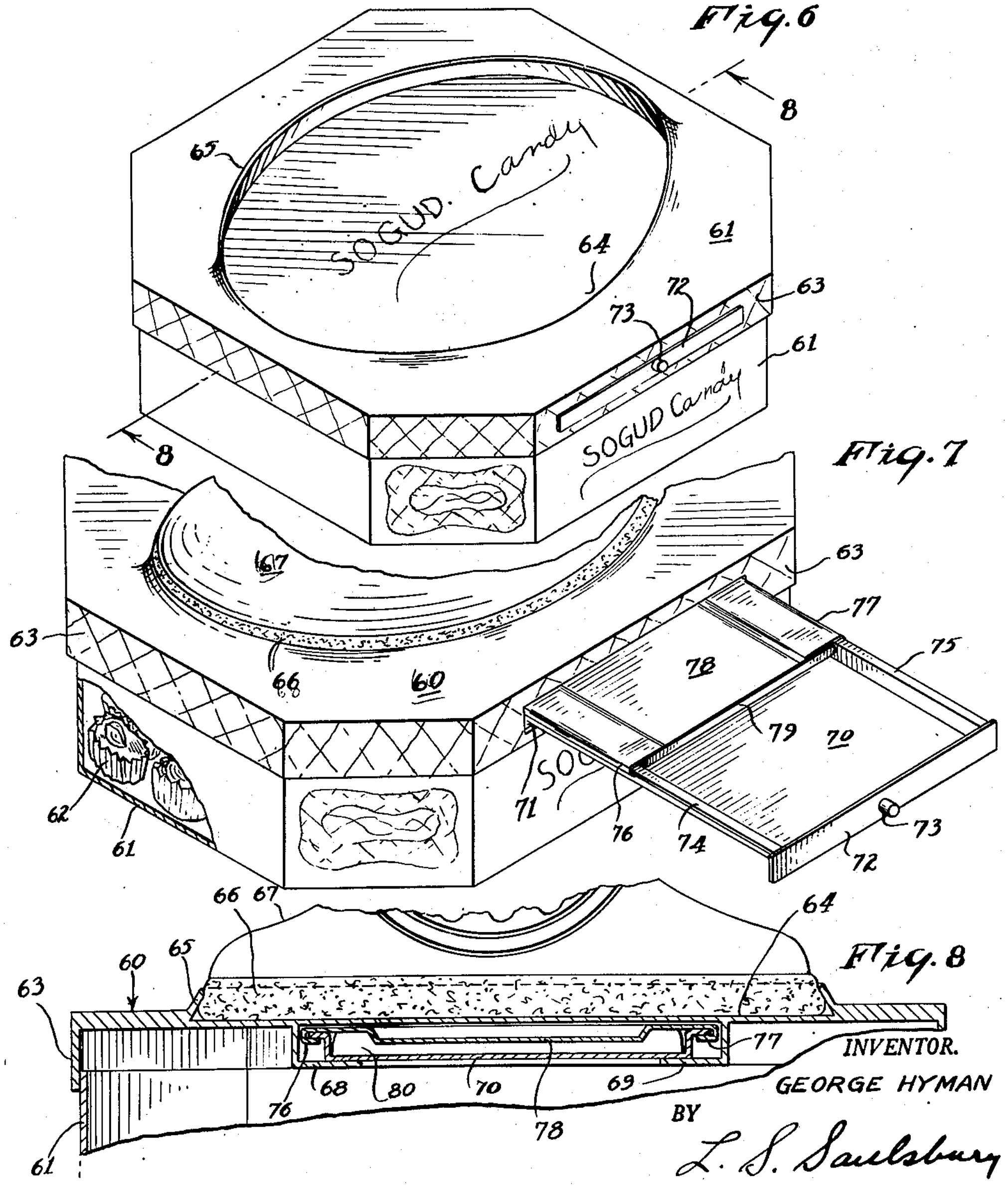
Fig. 6 is a perspective view of a telephone index pedestal in the form of a candy box cover and attached to the bottom of the candy box and being another modification of the present invention.
Fig. 7 is an enlarged fragmentary perspective view of the candy box index pedestal cover and candy box bottom shown in Fig. 6 but with a telephone set mounted in the opening of the cover and with the double drawer construction removed from the side of the index pedestal cover.
Fig. 8 is a fragmentary sectional view taken on line 8—8 of Fig. 6.

Referring now particularly to Figs. 6, 7 and 8 showing a telephone index pedestal indicated generally at 60 and adapted to serve as a cover for a chocolate or candy box 61 in which candy pieces 62 can be disposed. This pedestal 60 has a depending peripheral flange 63 for surrounding the box 61. The pedestal 60 can be of hexagonal shape or of any other shape and has a top recess 64 with an upwardly and inwardly inclined peripheral flange 65. Base 66 of a telephone set 67 can be disposed in the recess 64 and will be retained therein so that upon lifting the telephone set 67 the pedestal or cover 60 can be removed from the candy box bottom 61. The telephone set 67 in this instance is of the usual oval shaped type.

The pedestal 60 has depending, opposing and transversely extending guide portions 68 and 69 for supporting a bottom tray or drawer 70. The flange 63 of the pedestal 60 has an opening 71 out of which the drawer 70 can be pulled. The drawer 70 has a front portion 72 with a pull handle or knob 73 thereon. The drawer 70 has laterally extending flanges 74 and 75 over which extend folded in ends 76 and 77 of a top tray 78 which serve to support a telephone index book bearing frequently used numbers. The tray 78 has a front depending flange 79 which serves as a handle for sliding this tray 78 along the flanges 76 and 77 of the drawer 70.

The drawer 70 can contain a card bearing the advertising matter of local merchants whereas the tray 78 is adapted to receive and retain the telephone index book. The index book can be readily removed from the tray 78 upon the tray and drawer being pulled from the side opening 71 of the pedestal 60. In the back of the drawer there is an upstanding end portion 80 which will engage the inner end of the tray 78 so that the tray 78 will be pulled outwardly with the drawer 70.

Referring now particularly to Figs. 9 to 14 inclusive, there is shown a still further form of the invention wherein the pedestal is designed to provide a construction which can be used as a candy box with the drawers slidable to provide access to the candy and with the top cover being removable to provide access to the top of the pedestal for candy lying in and around the uppermost drawer.

This telephone index pedestal comprises a main drawer body 85 having stepped portions 86, 87 and 88. The portion 86 is open at the bottom and into the same is fitted a hollow space or drawer supporting member 89 having opposed inwardly extending supporting flanges 91 and 92 downwardly depressed and on which are respectively supported side flanges 93 and 94 of a bottom drawer 95.

Resting upon the respective flanges 93 and 94 of the drawer 95 are respectively flanges 96 and 97 of a telephone index book tray or drawer 98. The rear end of this drawer 98 has downwardly struck projections 99 and 100 which will engage turned up end 101 of the drawer 95 so as the top drawer 98 is pulled outwardly the bottom drawer 95 will be pulled with it. The bottom portion 86 has an opening 102 through which the drawers 95 and 98 are pulled.

Adapted to be fitted into the bottom drawer 95 is card 103 adapted to bear the names and telephone numbers of the local merchants. In order to elevate this card to remove it and so that numbers on the inner end of the same can be viewed, a lift handle device 104 is used. This device has a front handle portion of trough shape as indicated at 105 and a forwardly extending lip portion 106 which extends underneath the card 103. This device 104 is pivoted on a transverse shaft 107 extending between the sides of the drawer 95. Automatically as the handle portion 105 of the device 104 is pulled to pull outwardly the drawer 95, the card 103 will be lifted.

The top drawer or tray 98 supports a book 108 bearing telephone numbers and this drawer 98 has a pencil supporting handle 109 that will fit into the handle 105 of the device 104 on the bottom drawer 95. The stepped portion 87 has end openings 111 and 112 through which an upper drawer 113 adapted to bear memorandum pads 114 can be pulled. This drawer 113 has a handle flange 115 on one end of the drawer and a handle flange 116 on the opposite end of the drawer. On the opposite sides of the portion 87 are respectively guide portions 118 having respectively inturned flanges 119. The top drawer 115 slides under the flanges 119.

On the flanges 119 are adjustable stop members 120 which can be adjusted therealong to different positions and which extend downwardly into the drawer 113 to engage the forward or rear flanges in such a manner as to limit the amount of outward pull of the drawer through either opening 111 or 112 of the portion 87. If it is desired that the top drawer 113 be extended to a greater distance out of the opening 112 than out of the opening 111, the stop members are adjusted to a position 120 closer to the opening 112. It will be noted that by this construction the top drawer 113 is slidable transversely to the bottom drawers 95 and 98.

Figures 9, 10, 11, 12, 13, 14:
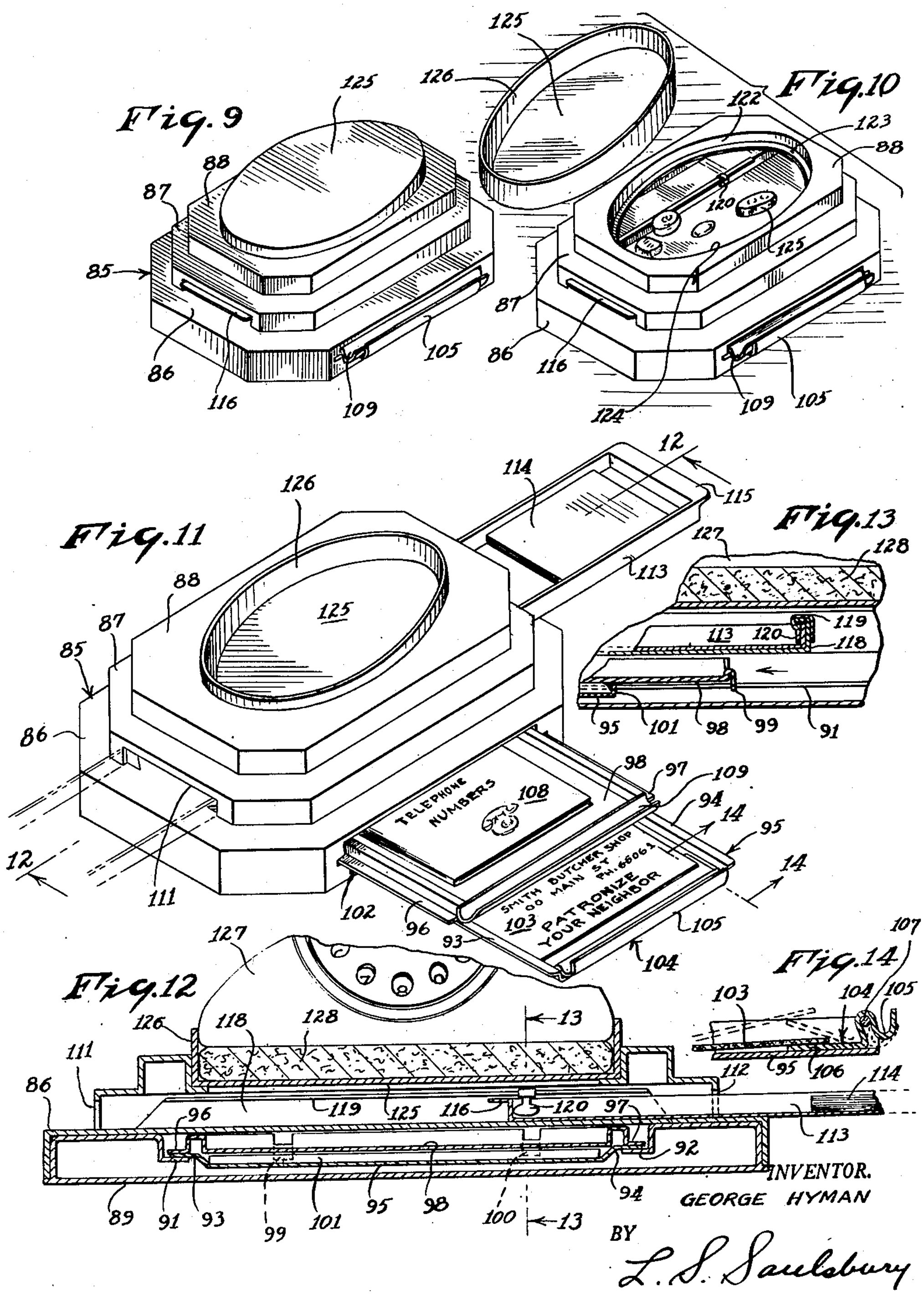
Fig. 9 is a perspective view of a modified form of the invention wherein a telephone index pedestal and pad is made in a form providing a top cover and drawers adapted to contain candy.
Fig. 10 is a collective and perspective view of the form of the invention shown in Fig. 9 with the top cover removed in order to provide access to the top opening to candy lying in the drawers within the pedestal.
Fig. 11 is an enlarged perspective view of the candy box telephone index pedestal shown in Fig. 9 with the several drawers pulled out.
Fig. 12 is a longitudinal sectional view of the candy box telephone index pedestal shown in Fig. 11, the view being taken on line 12—12 thereof.
Fig. 13 is an enlarged fragmentary sectional view of the candy box shown in Fig. 11, the view being taken on line 13—13 of Fig. 12.
Fig. 14 is a fragmentary sectional view showing the drawer with a lifting device as viewed on line 14—14 of Fig. 11.

The top stepped portion 88 has a depressed central flange 122 having an inturned lip 123, providing an opening 124 in the top portion 88 through which access can be had to candy pieces 125 that may be rested on the top drawer 113. A cover 125 having a flange 126 is adapted to fit the opening 124 and rests therein either on its flange 126 on the lip 123 as illustrated in Fig. 9, or as shown in Fig. 11 to receive and support telephone set 127, Fig. 12. This cover 125 can be readily removed and fitted into the opening 124. The bottom of the telephone set 127 has a felt base 128 which will frictionally engage the flange 126 of the cover 125. Accordingly the telephone set with the cover 125 can be removed to provide access to the top drawer 113. Candy can be continued to be kept in this drawer 113 as the memorandum pad 114 does not take up the entire space thereof.

It should now be apparent that there has been provided double drawer constructions for telephone index pedestals and also a pedestal wherein drawers running transversely to the double drawers are provided above the same. It shall be understood that the drawers can be shaped as desired to provide the different articles which are needed about a telephone. This telephone index pedestal houses the advertising sheet, the telephone number book, memorandum pad, pieces of candy and the handles of the drawers are so formed to support a pencil which will be available for use upon the memorandum pads.

While various changes may be made in the detail construction of the invention, it shall be understood that such changes shall be within the spirit and scope of the present invention as defined by the appended claims.

What is claimed is:

1. A telephone index pedestal comprising an upstanding body portion having an opening in one side thereof and in the top thereof in order to receive and retain the base of a telephone set, upper and lower drawers connected to each other for sliding movement with respect thereto, said drawers being movable together out of said side opening and the bottom of said body portion being open and a member adapted to be fitted into the body member through the opening in the bottom thereof, and said bottom closure member having opposing inwardly extending flanges, said drawers being supported and retained on said inwardly extending flanges.

2. A telephone index pedestal as defined in claim 1 and projection means extending between the drawers to effect pulling movement of the other drawer as one of the drawers is pulled.

3. A telephone index pedestal comprising an upstanding body portion having an oepning in one side thereof and in the top thereof in order to receive and retain the base of a telephone set, upper and lower drawers connected to each other for sliding movement relative to each other, said drawers being movable together out of said side opening, one of the drawers having a pivoted lift device having a handle portion adapted to be used in pulling the drawer, a forwardly extending portion adapted to extend under any article which may be disposed within the drawer, and said other drawer having a handle portion adapted to fit into the handle portion of the lift device of the one drawer so that the handle portions can be gripped together to remove or pull both drawers in unison.

References Cited in the file of this patent

UNITED STATES PATENTS

| | | |
|---|---|---|
| 315,108 | Bailey | Apr. 7, 1885 |
| 570,666 | Huebel | Nov. 3, 1896 |
| 791,112 | Rothwell | May 30, 1905 |
| 1,204,568 | Harnesberger | Nov. 14, 1916 |
| 2,283,690 | Munson | May 19, 1942 |